Nov. 7, 1961    K. KUEMMERLING    3,007,503
SAW HANDLE CONSTRUCTION
Filed May 24, 1960    2 Sheets-Sheet 1
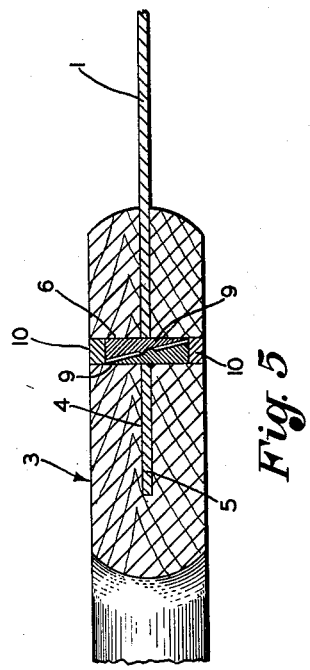
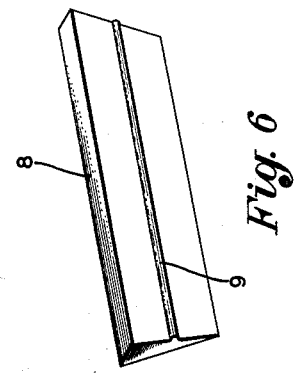
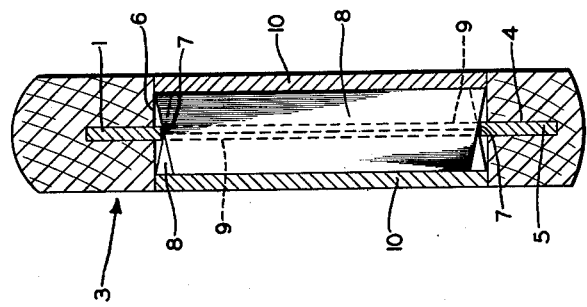
INVENTOR.
Karl Kuemmerling
BY
Frease, Bishop, Johns & Schick
ATTORNEYS Nov. 7, 1961     K. KUEMMERLING     3,007,503
SAW HANDLE CONSTRUCTION
Filed May 24, 1960     2 Sheets-Sheet 2
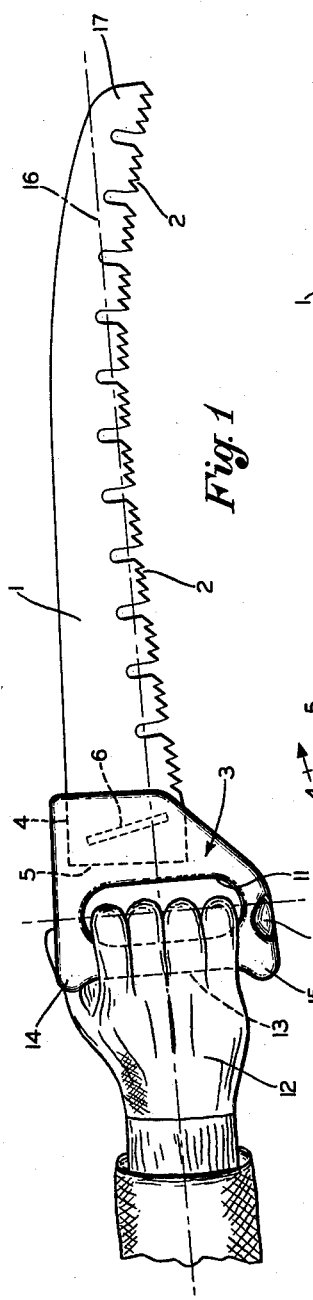
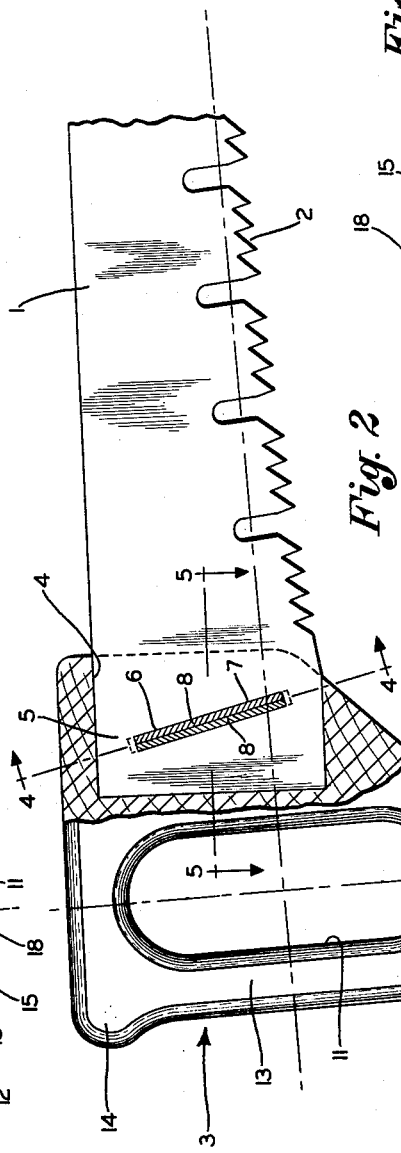
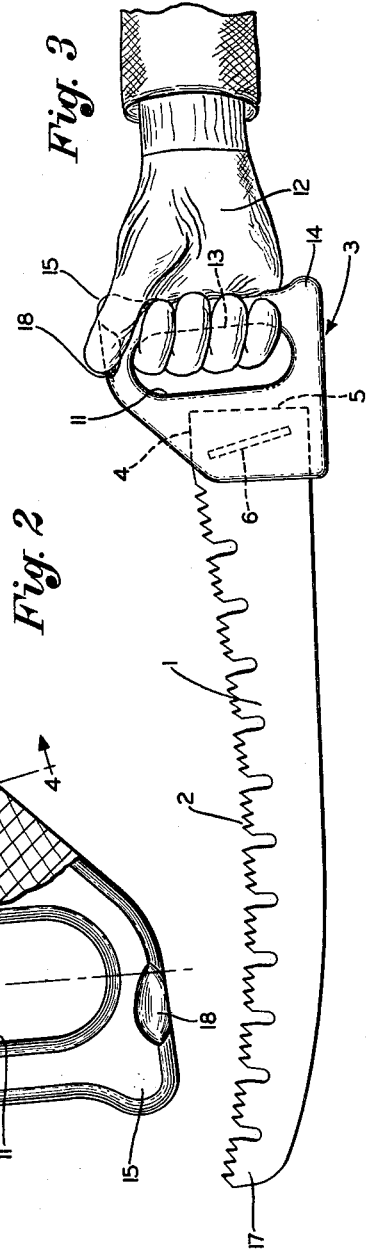
INVENTOR.
*Karl Kuemmerling*
BY
*Frease, Bishop, Johns & Schick*
ATTORNEYS

United States Patent Office 3,007,503
Patented Nov. 7, 1961

3,007,503
SAW HANDLE CONSTRUCTION
Karl Kuemmerling, 2910 Croydn Road NW.,
Canton, Ohio
Filed May 24, 1960, Ser. No. 31,352
2 Claims. (Cl. 145—31)

The invention relates to saw handles, and this application is a continuation-in-part of my copending application, Serial No. 785,427, filed January 7, 1959, and now abandoned.

Certain features of the invention relate to pull saws provided with curved blades, especially designed for use by arborists, tree surgeons and the like.

Certain other features of the invention relate to means for attaching a handle to a saw blade, and are applicable to any type of push saw or pull saw with either straight or curved blades.

Under present practice the handles of saws used by arborists and tree surgeons do not have a sufficiently large hand hole to accommodate a heavy glove worn by the operator. It is common practice for such workmen to wear heavy gloves to protect their hands against injury, regardless of the temperature or weather conditions, and also to protect their hands against tree paint.

Furthermore, the elliptic hand opening in saw handles now in general use is usually tilted forwardly. This is not entirely satisfactory for use with pull saws, as it has a tendency to pull the saw teeth up away from the work, and thus requires that the operator bear down on the blade while pulling the saw toward him.

Also, it is common practice to attach a saw blade to the wood handle by inserting the inner end of the blade into a slit in the inner end of the handle and locating screws or bolts transversely through the blade and handle.

Such a construction is not entirely satisfactory, as there is a tendency for the screws or bolts to become loosened permitting movement of the blade relative to the handle. Also, the heads of the screws or bolts form objectionable projections on the sides of the saw handle, which may cause electrocution of a tree trimmer if the saw blade comes into contact with an electric wire.

It is, therefore, an object of the present invention to provide a saw handle construction which overcomes the above-mentioned disadvantages and difficulties.

Another object of the invention is to provide a pull saw especially adapted for trimming trees and having an elliptic hand opening in the handle tilted rearwardly.

A further object of the invention is to provide such a saw in which an extension of the minor axis of the elliptic hand opening in the handle will pass longitudinally through the curved saw blade to the tip end thereof.

A still further object of the invention is to provide a saw handle of the character referred to having a recess therein adapted to receive the operator's thumb when the saw is reversed for under-cutting.

Another object is to provide a saw in which the handle is connected to the blade by opposed wedges located through transverse slots in the handle and the blade, opposite ends of the wedges being located within the slot in the handle.

A further object of the invention is to provide such a saw handle construction in which interengaging ribs are provided on opposed faces of the wedge plates for locking them in the slots.

The above objects together with others which will be apparent from the drawings and following description, or which may be later referred to, may be attained by constructing the improved saw handle in the manner hereinafter described in detail and illustrated in the accompanying drawings.

In general terms, the invention may be briefly described as comprising a saw comprising a blade and a handle formed of wood, or the like, and having a longitudinal groove in its inner end within which the inner end of the blade is received. A transverse slot is formed in the handle and registers with a similar slot in the blade, said slots being preferably slightly inclined.

A pair of opposed steel wedge plates are driven through opposite ends of the slot in the handle and through the slot in the blade for firmly attaching the end of the blade within the longitudinal groove in the handle.

For the purpose of locking the wedge plates within the slots, transverse ribs are provided upon opposed faces of the two wedge plates and adapted to snap past each other as the wedge plates are driven into place to lock the wedge plates in position. Opposite ends of the wedge plates are located within the slots in the handle, and the ends of the slot are filled with plastic wood, or the like, to form a smooth, flush surface on each side of the handle.

Where the invention is applied to pull saws especially designed for trimming trees and the like, the blade is curved longitudinally and the elliptic hand hole in the handle is tilted slightly rearwardly from its lower end to its upper end. The angle of the elliptic hand opening is such that an extension of the minor axis of the ellipse will pass longitudinally entirely through the curved saw blade to the tip end thereof.

The elliptic hand opening in the handle is of such width that it will accommodate a hand clad in a heavy glove, so that the saw may be easily and readily used by arborists and tree surgeons wearing heavy gloves to protect their hands.

A thumb recess is formed in the lower edge of the handle, just below and slightly to the rear of the center of the elliptic hand opening. This thumb recess is adapted to receive the operator's thumb when the saw is reversed for undercutting a tree branch or the like.

Having thus briefly described the invention, reference is now made to the accompanying drawings, in which;

FIG. 1 is a small scale side elevation of a tree trimming saw of the pull type provided with a handle embodying the invention, showing the manner in which the same is grasped by a hand clad in a heavy glove;

FIG. 2 is an enlarged side elevation, partly in section, of the improved saw handle and a fragmentary portion of the saw blade, showing the position of the elliptic hand opening in the handle and showing the wedges by means of which the end of the blade is retained within the longitudinal groove in the handle;

FIG. 3 is a small scale side elevation of the pull saw with improved handle, showing the manner in which the operator's thumb is received in the thumb recess when the saw is reversed for undercutting;

FIG. 4 is an enlarged section on the line 4—4, FIG. 2;

FIG. 5 is an enlarged section on the line 5—5, FIG. 2; and,

FIG. 6 is an enlarged, detached perspective view of one of the wedge plates.

Referring now more particularly to the embodiment of the invention illustrated in the accompanying drawings, in which similar numerals refer to similar parts throughout, a pull type saw especially adapted for tree trimming is shown in FIGS. 1, 2 and 3.

The blade 1 is curved longitudinally from end to end and the teeth 2, on the lower edge of the curved blade, are so constructed that they will cut when the blade is pulled toward the operator. The handle, indicated generally at 3, may be formed of wood, or other suitable material, and has a longitudinal groove 4 in its inner end shaped to snugly receive the inner end 5 of the saw blade.

The usual screws or bolts for attaching the handle to the saw blade are dispensed with, and novel means is provided for rigidly and permanently attaching the handle to the saw blade without providing any objectionable projections on the sides of the handle.

For this purpose, a transverse slot 6 is formed through the handle and preferably tilted backward as shown in the drawings. A corresponding slot 7 is formed in the inner end portion 5 of the blade adapted to register with the slot 6 in the handle when the blade is inserted therein, the slot 7 in the blade being preferably of less length than the slot 6 in the handle.

A pair of opposed wedge plates 8, formed of steel or other suitable material, are driven into opposite sides of the slot 6 in the handle and through the slot 7 in the blade. These wedge plates are preferably provided on their opposed faces with transverse ribs 9 adapted to snap past each other so as to interengage to lock the wedge plates within the slots in the handle and saw blade.

As best shown in FIGS. 4 and 5, the length of the wedge plates 8 is less than the thickness of the saw handle 3, whereby opposite ends of the wedge plates are received within the slots 6 in the handle and spaced from the outer surfaces of the handle. This space may then be filled with plastic wood, or the like, as indicated at 10, to entirely enclose the wedge plates within the saw handle and to provide smooth flush outer surfaces upon the saw handle.

As shown in FIGS. 4 and 6, the wedge plates 8 are not only tapered in thickness but they may be tapered in width so that they may be easily centered in the slot 7 in the saw blade and will wedge therein when driven into position.

This construction of attachment of the handle to the blade may be applied to any type of pull or push saw, not only for use in trimming trees but for any other purpose for which a saw may be used.

In FIGS. 1-3 the invention is shown as applied to a pull type saw especially designed for use by arborists and tree surgeons in trimming trees and the like. In this embodiment of the invention the elliptic hand opening 11 in the handle 3 is of considerably greater width than the hand opening in the conventional saw, for the purpose of accommodating an arborist's or tree surgeon's hand clad in a heavy glove, as indicated at 12 in FIGS. 1 and 3.

As a consequence, the grip portion 13, between the hand opening 11 and the rear edge of the handle, is considerably smaller in width than in usual practice, thus further accommodating the hand clad in a heavy glove. Rearwardly extending projections 14 and 15 are provided upon the saw handle at the upper and lower ends of the grip portion 13 to assist in properly positioning the hand upon said grip portion of the handle.

An important feature of the invention, as applied to pull saws, resides in the location and position of the hand opening 11 within the saw handle. Instead of being tilted forward, as is common practice in saw handles, the hand opening 11 is tilted slightly rearwardly.

As shown in the drawings, the hand opening 11 is tilted rearwardly at such an angle that an extension of the minor axis of the ellipse, as indicated at 16, will pass longitudinally through the saw blade 1 to the forward tip end 17 thereof.

With this position of the hand opening 11, relative to the saw blade, when the saw is pulled toward the operator, the teeth 2 upon the curved lower edge of the blade will be pulled down into the wood so as to cause the saw teeth to cut into the wood with every pull upon the blade.

If the hand opening in the handle were tilted forwardly, as in common practice, the tendency would be for the saw teeth to be pulled upward away from the wood as the blade is pulled toward the operator, thus requiring that downward pressure be exerted upon the blade in order to cause the same to cut into the wood.

It is very difficult for an arborist or tree surgeon to exert this downward pressure upon the saw with the hand with which he is pulling the blade toward him. Since it is usually necessary for such workmen to use the other hand to hold themselves in the tree, the other hand therefore cannot be used for bearing down upon the saw blade.

In actual practice, it has been found that with the hand opening thus tilted slightly rearwardly, so that an extension of the minor axis thereof passes longitudinally entirely through the saw blade to the forward tip end thereof, it is only necessary for the operator to pull the saw toward him without exerting any downward pressure thereon, in order to quickly and easily cut into the wood.

Another feature of the invention, especially applicable for use in tree trimming saws, although it is applicable to other types of saws where undercutting is desired, comprises a thumb recess 18 formed on the right side of the handle 3, in the lower edge thereof, below and to the rear of the major axis 19 of the elliptic hand opening 11. This recess is adapted to receive the operator's thumb when the saw is reversed for undercutting, as shown in FIG. 3.

From the above it will be evident that a novel, simple and efficient saw handle construction is provided, by means of which the blade is rigidly and permanently secured to the handle without the use of screws, bolts or other means which form objectionable projections upon the sides of the handle, which may cause electrocution of a tree trimmer if the saw blade contacts an electric wire.

It will also be obvious from the foregoing description that a saw handle construction is provided which is especially adapted for pull saws for trimming trees and the like. A saw handle is provided with an enlarged hand opening and reduced grip so as to accommodate a workman's hand clad in a heavy glove. Thus the improved saw handle permits the use of the saw for trimming trees and the like by arborists and tree surgeons wearing heavy gloves to protect their hands from paint and from injury by contact with trees, branches, bark and the like.

And finally, it will be seen that by tilting the elliptic hand opening backward at an angle, as differentiated from the usual saw handle, in which the hand opening is tilted forwardly, the teeth of the curved blade of a pull saw will be pulled down into the wood so as to cut sharply therein with every rearward pull upon the saw handle, without the necessity of exerting downward pressure upon the blade. It will also be evident that the thumb recess 18 provides a rest for the operator's thumb when the saw is reversed for under-cutting.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A saw including a handle having a longitudinal groove in its inner end, a saw blade having its inner end fitted within said groove in the handle, there being a transversely disposed slot in the handle and a corresponding slot in the blade registering therewith, a pair of opposed wedge plates located in said slots in the handle and blade for rigidly attaching the handle to the blade, said wedge plates being tapered in width and interengaging ribs on opposed faces of said wedge plates for locking the wedge plates in said slots, said wedge plates being of less length than the thickness of the handle whereby the ends of the wedge plates are located inwardly from the ends of the slot in the handle, and plastic material in opposite ends of the slot in the handle enclosing said wedge plates therein.

2. A saw including a handle as defined in claim 1, in which the groove in the handle is of a width equal to the width of the blade, and in which the transversely disposed slots in the handle and in the blade terminate at points adjacent the upper and lower edges of the blade and the wedges are of a width substantially equal to the lengths of said slots.

References Cited in the file of this patent

UNITED STATES PATENTS

| | | |
|---|---|---|
| 157,634 | Reagan | Dec. 8, 1874 |
| 296,241 | Stansbury | Apr. 1, 1884 |
| 609,125 | Smith | Aug. 16, 1898 |
| 647,020 | Muller | Apr. 10, 1900 |
| 681,090 | White | Aug. 20, 1901 |
| 911,094 | Vessels | Feb. 2, 1909 |
| 1,339,357 | Kopriva | May 4, 1920 |
| 1,919,748 | Roberts | July 25, 1933 |
| 2,097,982 | Kist et al. | Nov. 2, 1937 |